US011296972B2

(12) United States Patent
Bisht et al.

(10) Patent No.: US 11,296,972 B2
(45) Date of Patent: Apr. 5, 2022

(54) SCALABLE NETWORK PATH TRACING

(71) Applicant: Telefonaktiebolaget LM Ericsson (publ), Stockholm (SE)

(72) Inventors: Ashutosh Bisht, Bangalore (IN); Joel Halpern, Leesburg, VA (US)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 57 days.

(21) Appl. No.: 16/635,980

(22) PCT Filed: Aug. 8, 2017

(86) PCT No.: PCT/IB2017/054849
§ 371 (c)(1),
(2) Date: Jan. 31, 2020

(87) PCT Pub. No.: WO2019/030552
PCT Pub. Date: Feb. 14, 2019

(65) Prior Publication Data
US 2021/0144082 A1    May 13, 2021

(51) Int. Cl.
*H04L 45/02* (2022.01)
*H04L 43/062* (2022.01)
*H04L 43/10* (2022.01)
*H04L 45/48* (2022.01)
*H04L 45/74* (2022.01)
*H04L 69/22* (2022.01)

(52) U.S. Cl.
CPC .......... *H04L 45/02* (2013.01); *H04L 43/062* (2013.01); *H04L 43/10* (2013.01); *H04L 45/48* (2013.01); *H04L 45/74* (2013.01); *H04L 69/22* (2013.01)

(58) Field of Classification Search
CPC combination set(s) only.
See application file for complete search history.

(56) References Cited

U.S. PATENT DOCUMENTS

| 10,367,737 | B1* | 7/2019 | Morris ................... H04L 45/22 |
| 2014/0229612 | A1 | 8/2014 | Chandrashekar et al. |
| 2015/0124837 | A1* | 5/2015 | Saltsidis ............ H04L 41/0879 370/419 |
| 2015/0195757 | A1* | 7/2015 | Tietz ................. H04W 36/0094 455/438 |
| 2017/0005901 | A1* | 1/2017 | Gareau ................... H04L 43/10 |

(Continued)

OTHER PUBLICATIONS

Brockners, et al., "Data Fields for In-situ OAM," draft-brockners-inband-oam-data-03, IETF Internet-Draft, Mar. 13, 2017, pp. 1-24.

(Continued)

*Primary Examiner* — Xavier S Wong
(74) *Attorney, Agent, or Firm* — Christopher & Weisberg, P.A.

(57) ABSTRACT

A method implemented in a network device to enable scalable network path tracing. The method includes receiving a data packet with operations, administration and maintenance (OAM) information, updating a previous node identifier field in the OAM information, updating a current node identifier field in the OAM information, and sending a copy of the updated data packet with OAM information to a collector to build a packet trace.

18 Claims, 12 Drawing Sheets

(56) References Cited

U.S. PATENT DOCUMENTS

2018/0294969 A1* 10/2018 Holness .................... H04L 9/32
2020/0104154 A1*  4/2020 Chou .................... H04L 43/022

OTHER PUBLICATIONS

Brockners, et al., "Data Fields for In-situ OAM," draft-brockners-inband-oam-data-07, IETF Internet-Draft, Jul. 2, 2017, pp. 1-29.
Brockners, et al., "Encapsulations for In-situ OAM Data," draft-brockners-inband-oam-transport-03, IETF Internet-Draft, Mar. 12, 2017, pp. 1-21.
Brockners, et al., "Requirements for In-situ OAM," draft-brockners-inband-oam-requirements-03, IETF Network Working Group Internet-Draft, Mar. 13, 2017, pp. 1-24.
Mizrahi, et al., "An Overview of Operations, Administration, and Maintenance (OAM) Tools," IETF Request for Comments: 7276, Jun. 2014, pp. 1-46.
Song et al., "On Scalability of In-situ OAM," draft-song-ippm-ioam-scalability-01, IETF Trust Internet-Draft, Jun. 27, 2017, pp. 1-12.

* cited by examiner

In-situ OAM Incremental Trace Option Header:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      IOAM-Trace-Type          | Maximum Length|     Flags     |
+-+-+-+-+-+-+-+-+-+-+-+-+-+-+-+-+-+-+-+-+-+-+-+-+-+-+-+-+-+-+-+-+
```

In-situ OAM Incremental Trace Option Data MUST be 4-byte aligned:

```
+-+-+-+-+-+-+-+-+-+-+-+-+-+-+-+-+-+-+-+-+-+-+-+-+-+-+-+-+-+-+-+-+
|                                                               |
|                       node data list [0]                      |
|                                                               |
+-+-+-+-+-+-+-+-+-+-+-+-+-+-+-+-+-+-+-+-+-+-+-+-+-+-+-+-+-+-+-+-+
|                                                               |
|                       node data list [1]                      |
|                                                               |
+-+-+-+-+-+-+-+-+-+-+-+-+-+-+-+-+-+-+-+-+-+-+-+-+-+-+-+-+-+-+-+-+
~                              ...                              ~
+-+-+-+-+-+-+-+-+-+-+-+-+-+-+-+-+-+-+-+-+-+-+-+-+-+-+-+-+-+-+-+-+
|                                                               |
|                     node data list [n-1]                      |
|                                                               |
+-+-+-+-+-+-+-+-+-+-+-+-+-+-+-+-+-+-+-+-+-+-+-+-+-+-+-+-+-+-+-+-+
|                                                               |
|                       node data list [n]                      |
|                                                               |
+-+-+-+-+-+-+-+-+-+-+-+-+-+-+-+-+-+-+-+-+-+-+-+-+-+-+-+-+-+-+-+-+
```

FIG. 1B

SCALABLE NETWORK PATH TRACING

CROSS-REFERENCE TO RELATED APPLICATIONS

This application is a national stage of International Application No. PCT/IB2017/054849, filed Aug. 8, 2017, which is hereby incorporated by reference.

TECHNICAL FIELD

Embodiments of the invention relate to the field of network path tracing; and more specifically, to a process for scalable network path tracing using Operations, Administration and Maintenance information in data packets.

BACKGROUND

Operations, Administration, and Maintenance (OAM) as used herein refers to a set of protocols, definitions and functions for fault detection and isolation, and for performance measurement in Internet Protocol (IP) networks. Various OAM aspects have been defined for various layers in the protocol stack. OAM tools defined by the Internet Engineering Task Force (IETF) are described by RFC 7276 and similar documents.

One function that is supported in connection with OAM and similar technologies is path tracing. Path tracing is the determination of a path that a particular packet or set of packets takes to reach a given destination. Path tracing however creates significant overhead with specialized packets being sent across the network and the packets collecting information about each node it traverses along the way. At the end of the path the amount of information has increased significantly. This process of adding information at each hop of the path has limited scalability with long paths causing the packets to exceed maximum allowed sizes in some instances. For example, in some networks, OAM packets are utilized for network path tracing. With each hop adding its information to the OAM packet.

In addition, if specialized (e.g., OAM) packets are utilized to trace the paths of standard data packets, they may be forwarded differently than the standard data packets. Link aggregation groups, load balancers and similar network components may alter the path of packets based on their contents or header information even when they have the same destination. Thus, the use of separate packets for tracing paths may result in inaccurate path information when the path that data packets are taking is sought, because the separate packets may have different information in the header or body that is used for path forwarding.

SUMMARY

The embodiments include a method executed by a network device functioning as a node in a network to enable scalable network path tracing. The method includes receiving a data packet with operations, administration and maintenance (OAM) information, updating a previous node identifier field in the OAM information, updating a current node identifier field in the OAM information, and sending a copy of the updated data packet with OAM information to a collector to build a packet trace.

The embodiments further include a network device functioning as a node in the network to enable scalable network path tracing. The network device includes a non-transitory machine-readable medium having stored therein a scalable tracer, and a processor coupled to the non-transitory machine-readable medium. The processor executes the scalable tracer. The scalable tracer receives a data packet with OAM information, updates a previous node identifier field in the OAM information, updates a current node identifier field in the OAM information, and sends a copy of the updated data packet with OAM information to a collector to build a packet trace.

In another embodiment, a computing device is in communication with the network device. The computing device is to execute a plurality of virtual machines for implementing network function virtualization (NFV). The computing device is configured to execute the method to enable scalable network path tracing. The network device includes a non-transitory machine-readable medium having stored therein a scalable tracer, and a processor coupled to the non-transitory machine-readable medium. The processor executes a virtual machine from the plurality of virtual machines. The virtual machine executes the scalable tracer. The scalable tracer receives a data packet with OAM information, updates a previous node identifier field in the OAM information, updates a current node identifier field in the OAM information, and sends a copy of the updated data packet with OAM information to a collector to build a packet trace.

In a further embodiment, a controller device is in communication with the network device. The controller device is configured to execute another method to enable scalable network path tracing. The controller device includes a non-transitory machine-readable medium having stored therein a collector, and a processor coupled to the non-transitory machine-readable medium. The processor executes the collector. The collector receives a copy of the OAM information, identifies a previous node in the copy of the OAM information, identifies current node information in the copy of the OAM information and adds the current node information to a tree representing a trace as a leaf node.

BRIEF DESCRIPTION OF THE DRAWINGS

The invention may best be understood by referring to the following description and accompanying drawings that are used to illustrate embodiments of the invention. In the drawings:

FIG. 1B is a format of an incremental trace option for an OAM container or header.

DETAILED DESCRIPTION

Figure 1A:
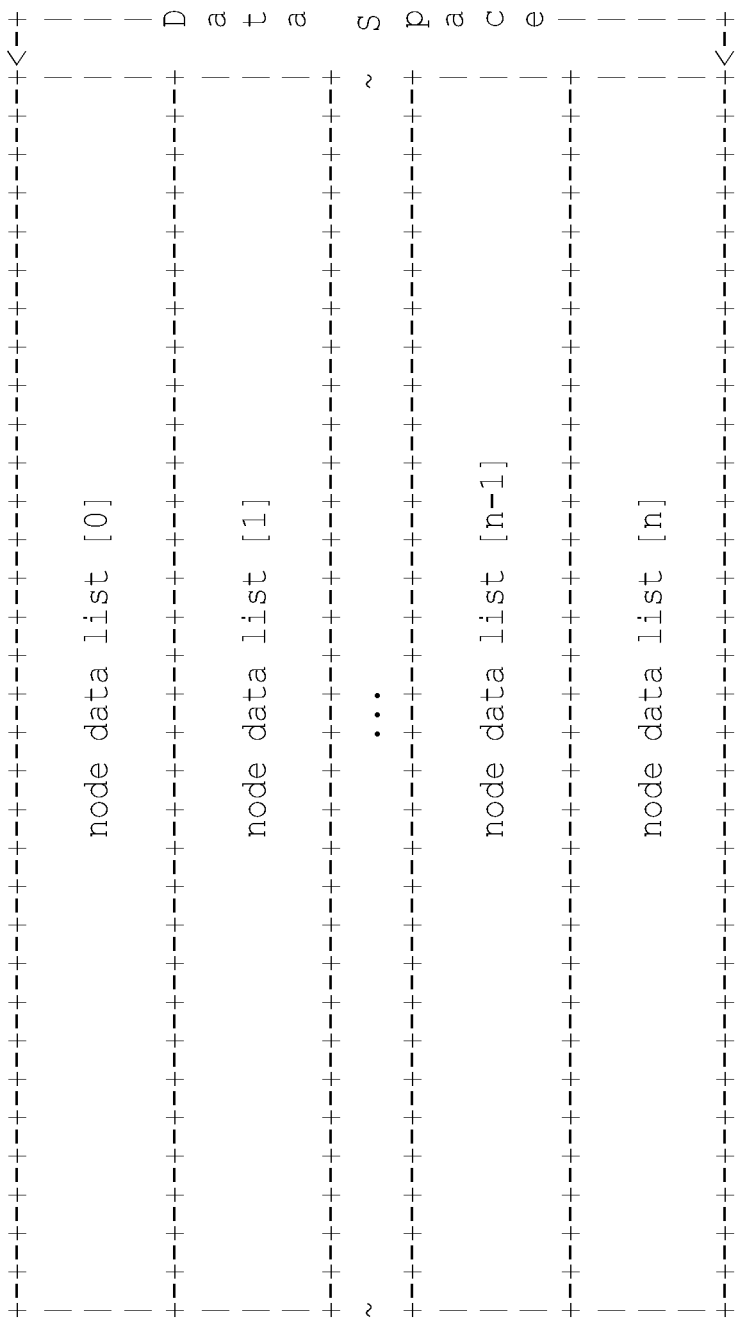
FIG. 1A is a format of a pre-allocated trace option for an Operations, Administration and Maintenance (OAM) container or header.

The following description describes methods and apparatus for a process of a scalable network path trace. In particular thee methods and apparatus support a scalable process that utilizes a fixed OAM header in data packet. The fixed size header is copied and sent to a collector by each node that the original data packet traverses. The collector then assembles the copies of the header information into a tree structure. At each node in the path, the current node information is updated and the previous node information is updated. A copy of this information is sent to the collector which is sufficient for it to identify the parent (previous node) for the current node information, which can be added as a leaf node to the tree data structure representing the path trace. This updating of the OAM information in the data packet is an in-situ OAM header update and utilizes a fixed size header with only the current node and previous node information, rather than having the information of each node in the path added and maintained until the end of the path. This allows the OAM information in the data packet to traverse any number of nodes in a path without becoming too large and thus provides scalability.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

In-Situ OAM

The embodiments provide a process that utilizes In-situ OAM data. In-situ OAM refers to the recording of OAM information within the data packet while the data packet traverses a path of a particular network domain. More specifically, the term "in-situ" refers to the fact that the OAM data is added to the standard data packets rather than the OAM data being sent within separate packets specifically dedicated to OAM. Using in-situ OAM data provides various advantages in OAM functions. For example, where the OAM data is sent in separate OAM packets, then these OAM packets may be routed differently than standard data packets due to load balancing and similar network conditions. This potential difference in packet handling would undermine the purpose of the separate OAM packets for many monitoring functions and for functions like path tracing where the goal is to determine how the standard data packets are traversing a network. In-situ OAM network path tracing is to complement "out-of-band" (i.e., the use of separate OAM packets) or "active" mechanisms such as Ping or Traceroute that similarly do not place OAM data into standard data packets.

In-situ OAM mechanisms can be leveraged where current out-of-band mechanisms do not apply or do not offer the desired results, such as proving that a certain traffic flow takes a pre-defined path, Service level agreements (SLA) verification for the live data traffic, detailed statistics on traffic distribution paths in networks that distribute traffic across multiple paths, or similar scenarios are those in which probe traffic is potentially handled differently than regular data traffic by the network devices and network links.

In-situ OAM can be leverage for several use cases, such as: (1) flow debugging (where OAM is used to discover which path(s) a particular set of traffic (identified by an n-tuple) takes in the network, such a procedure is particularly useful in the cases where traffic is balanced across multiple paths, like with link aggregation (i.e., managed by link aggregation control protocol (LACP)) or equal cost multi-pathing (ECMP); (2) trend analysis on traffic patterns, where OAM is used to analyze if (and if so how) the forwarding path for a specific set of traffic changes over time, which can give hints to routing issues, unstable links and similar network issues; (3) path verification or service function path verification, where proof and verification of packets traversing check points in the network is performed, and where check points can be nodes in the network or service functions; (4) SLA verification, where OAM is used to verify that a negotiated service level agreement (SLA), e.g., for packet drop rates or delay/jitter is conformed to by the actual traffic; (5) traffic matrix, where OAM is used to derive the network traffic matrix, where traffic for a given time interval between any two edge nodes of a given domain is determined, this can be performed for all traffic or on a per Quality of Service (QoS) class; (6) network delay distribution, where OAM is used to show delay distribution across the network by node or links, if this function is enabled per application or for a specific flow then the process displays the path taken along with the delay incurred at every hop; and (7) path heat maps, where OAM is used to discover highly utilized links in the network.

In-situ OAM Architecture

In-situ OAM is expected to be deployed in a specific domain managed by a specific provider or operator, rather than on the overall Internet. The part of the network which employs in-situ OAM is referred to as the "in-situ OAM-domain." In-situ OAM data is added to a packet upon entering the in-situ OAM-domain and is removed from the packet when exiting the domain. Within the in-situ OAM-domain, the in-situ OAM data may be updated by network nodes that the packet traverses.

A network device that adds an in-situ OAM data container or header to the packet to capture in-situ OAM data is called the "in-situ OAM encapsulating node," whereas the device which removes the in-situ OAM data container or header is referred to as the "in-situ OAM decapsulating node." Nodes within the in-situ OAM domain which are aware of in-situ OAM data and read and/or write or process the in-situ OAM data are called "in-situ OAM transit nodes." Any subset of the nodes in the in-situ OAM domain may be in-situ OAM transit nodes, including one or all of the nodes.

In-situ OAM Tracing Options

"In-situ OAM tracing data" is expected to be collected at every node that a packet traverses, i.e., in a typical deployment all nodes in an in-situ OAM-domain would participate in in-situ OAM. In order to optimize hardware and software implementations tracing is defined as two separate options: (1) pre-allocated trace options, this trace option is defined as a container of node data fields with pre-allocated space for each node to populate its information. This option is useful for software implementations where it is efficient to allocate the space once and index into the array to populate the data during transit; and (2) incremental trace options, this trace option is defined as a container of node data fields where each node allocates and pushes its node data immediately following the option header. With incremental trace options, the number of node data fields recorded and maximum number of node data that can be recorded are written into the option header. This type of trace recording is useful for some of the hardware implementations as this eliminates the need for the transit network elements to read the full array in the option and allows for arbitrarily long packets as the MTU allows. Further details of these two options are discussed herein below.

Pre-Allocated Trace Option

The pre-allocated trace option, has an encapsulation with the format illustrated in FIG. 1A. The OAM container or header includes an IOAM-trace-type field, an Octets left field and a flags field. The IOAM-trace-type field is a 16-bit identifier which specifies which data types are used in the node data list. The IOAM-Trace-Type value is a bit field. Bit 0—indicates presence of hop-limit and node-id in the node data. Other bit fields indicate other parameters such as timestamp, time-delay and similar parameters. The Octets-left field is an 8-bit unsigned integer. This field is the data space in octets remaining for recording the node data. This is used as an offset in octets in the following data space to record node data elements. The node data field is a list of nodes that are in the trace that is populated as the packet progresses along its path.

Incremental Trace Option

The incremental trace option, has an encapsulation with the format illustrated in FIG. 1B. This OAM container or header includes an IOAM-trace type field, a maximum length field and a flags field followed by the node data list. The IOAM-trace-type is a 16-bit identifier which specifies which data types are used in the node data list. The IOAM-Trace-Type value is a bit field. Bit 0—indicates presence of hop-limit and node-id in the node data. Other bit fields indicate other parameters such as timestamp, time-delay and similar parameters. The maximum length field specifies the maximum length of the node data list in octets. Given that the sender knows the minimum path maximum transmission unit (MTU), the sender can set the maximum of node data bytes allowed before exceeding the MTU. Thus, a simple comparison between "Opt data Len" and "Max Length" allows one to decide whether or not data could be added.

The prior art encompassed a number of limitations and issues. The above-referenced trace options are illustrative of existing mechanisms with limitations in scalability for OAM network path tracing. Specifically, these approaches provide a limited number of records in the form of limited node data list entries in the respective OAM container or header. Since the OAM data is added by each node in the transit path, the size of packet increases on each hop. In order to prevent packet fragmentation, both the 'pre-allocated trace option' and the 'incremental trace option' limit the number of nodes that can record data. In order to indicate that data could not be recorded, both the methods have an overflow flag. For the pre-allocated trace option, Flag Bit 0 "Overflow" (0-bit) is used. This bit is set by the network element if there is not a sufficient number of bytes left to record node data. in this case, no node data field is added and the overflow "0-bit" must be set to "1" in the header. Similar to the pre-allocated case, for the incremental trace option, an overflow bit in the flag field is used. A bit 0 "Overflow" (0-bit) is set by the network element being transited by the packet if there is not a sufficient number of bytes left to record node data. In this case, no node data field is added and the overflow "0-bit" must be set to "1" in the header.

In the pre-allocated and incremental trace options, a determining of the path MTU must be performed. With in-situ OAM information being added by transited nodes, the data packet cannot at any point become larger than the path MTU. In the existing in-situ OAM specifications, the encapsulating node adds the OAM header that indicates the maximum OAM data bytes that can be recorded (via either the 'octet-left' field in the pre-allocated option or the 'maximum-length' field in the incremental option). This requires additional processing logic and/or resources in the encapsulating node to determine an expected path MTU. The embodiments overcome these limitations of the art by providing a process and system that utilizes a fixed header or container for OAM that enables scalability and avoids MTU computations.

The embodiments employ the insight that the final packet trace is similar to a tree data type. A list data type may be sufficient in simple cases when there is no packet replication. A tree data type is sufficient when a network trace includes scenarios where copies/cloning of the in-situ OAM packet is done. In some embodiments, a tree data type can be constructed where each tree node carries a 'pointer' to its parent node. Each node in the tree corresponds to a transited node in the trace path.

Figure 2:
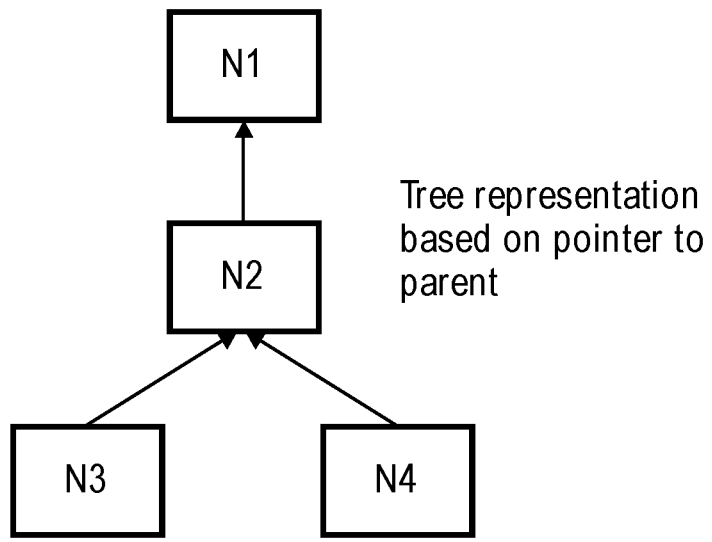
FIG. 2 is a diagram of one embodiment of a tree representation of a path trace.

FIG. 2 is a diagram of one example of a tree representation of a trace path. In the example, N1 may be the first node transited in the path. According to the embodiments, it will be represented by a node in the tree data structure. The next/subsequent node transited in the trace of the network path is N2. It is represented as a node (where this node stores information about the corresponding node N2) in the tree data structure that is a child of the N1 node and has a pointer to its parent. At node N2 the data packet is replicated and forwarded to nodes N3 and N4 in the in-situ OAM domain. These nodes are similarly represented in the tree data structure as leaves with common parent N2.

The tree data structure is collected by a central collector node in the in-situ OAM domain. Each transited node sends information to the collector as it is traversed. The in-situ OAM data (either in a container or header) has a fixed sized that consists of following fields (1) Packet-id1@cur-node, which is a unique identifier of a packet at current network node, and (2) Packet-id2@prev-node, which is unique identifier of packet at previous network node. The packet ids are noted as packet-id1 and packet-id2 to indicate that these are independently generated at two separate nodes. The OAM container or header (referred to herein after as the OAM header for conciseness) may include additional OAM data such as a timestamp (correlated to node traversal), ingress interface (at the corresponding node), egress interface (at the corresponding node) and similar information.

Figure 3:
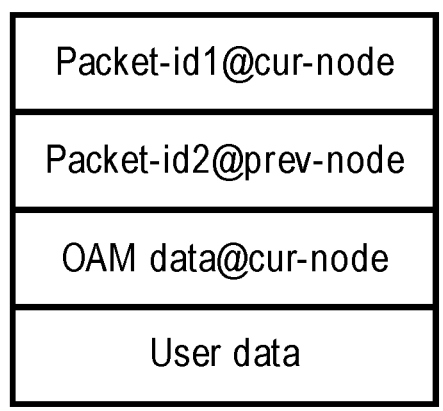
FIG. 3 is a diagram of one embodiment of a fixed size packet header for a OAM packet.

FIG. 3 is a diagram of the fixed size OAM header according to one embodiment. The OAM header includes three fields and encapsulates an underlaying packet. The underlying packet is shown as "user data" in the illustration. The packet-id1 @cur-node field identifies the current node processing the packet along with containing information about the current node. The packet-id2@prev-node field identifies the node that the packet was just received from, which is the previous node in the path being traced. The OAM data@cur-node field provides additional information related to OAM monitoring or functions related to the current node. The fields can have any order relative to one another. In some embodiments, described further herein the location of these fields can be dynamically modified during transit of the network path. These fields are provided by way of example and not limitation. The fields can have any name, size or location such that the previous node information and current node information are present in the OAM header.

Figure 4:
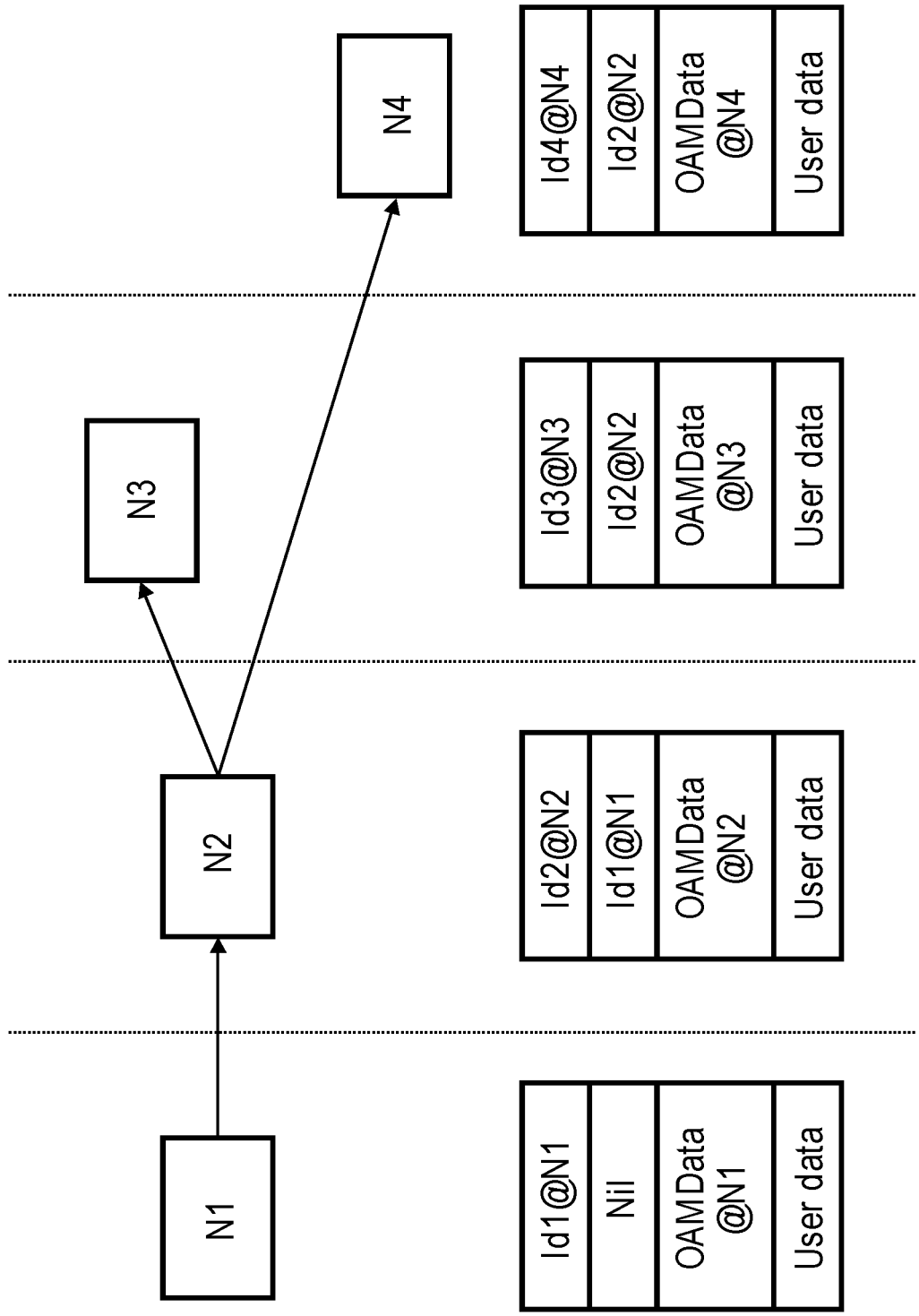
FIG. 4 is a diagram of one embodiment of the process of updating OAM packet headers during a path trace.

FIG. 4 is a diagram of the changes to an OAM header as it traverses a network path. At each node in the network path, the node processes and updates the OAM header. The node copies the packet-id1@cur-node (i.e., the current node field) from an incoming packet to the packet-id2@prev-node field (i.e., the previous node field). The incoming 'current' node is the information of the node that sent the packet to the currently processing node. In the example of FIG. 4, the current node field is the first field and populated by the current node. The illustration shows the state of the current node field and previous node field after processing at each node.

Each node generates a packet identifier for the packet and stores it in packet-id1@cur-node field (i.e., the current node field). The node then performs any normal packet processing related to the encapsulated user data and/or other OAM functions other than the network path tracing. In parallel, before or after this other processing, the node collects OAM data for the packet and stores it in OAM-data@cur-node field (i.e., the OAM data field). This OAM data can be any type of OAM related function data. The node can then forward the packet to next destination according to the addressing within the user data of the packet.

In some embodiments, the OAM header information of these packets at each node are made available at a collector implemented by at least one centralized node. This information can be provided by sending a copy of the OAM header or the entire packet after processing, by packet mirroring, or similar processes. When the collector receives this information, it can use it to construct network path traces for the packet.

In the example of FIG. 4, the network includes four network nodes N1 to N4. The illustration demonstrates the state of the OAM header fields as the packet follows a network path that goes initially from node N1 to N2. At node N2, it is replicated and sent to two nodes N3 and N4. The lower part of figure shows the state of the various packet headers at each node.

Figure 5:
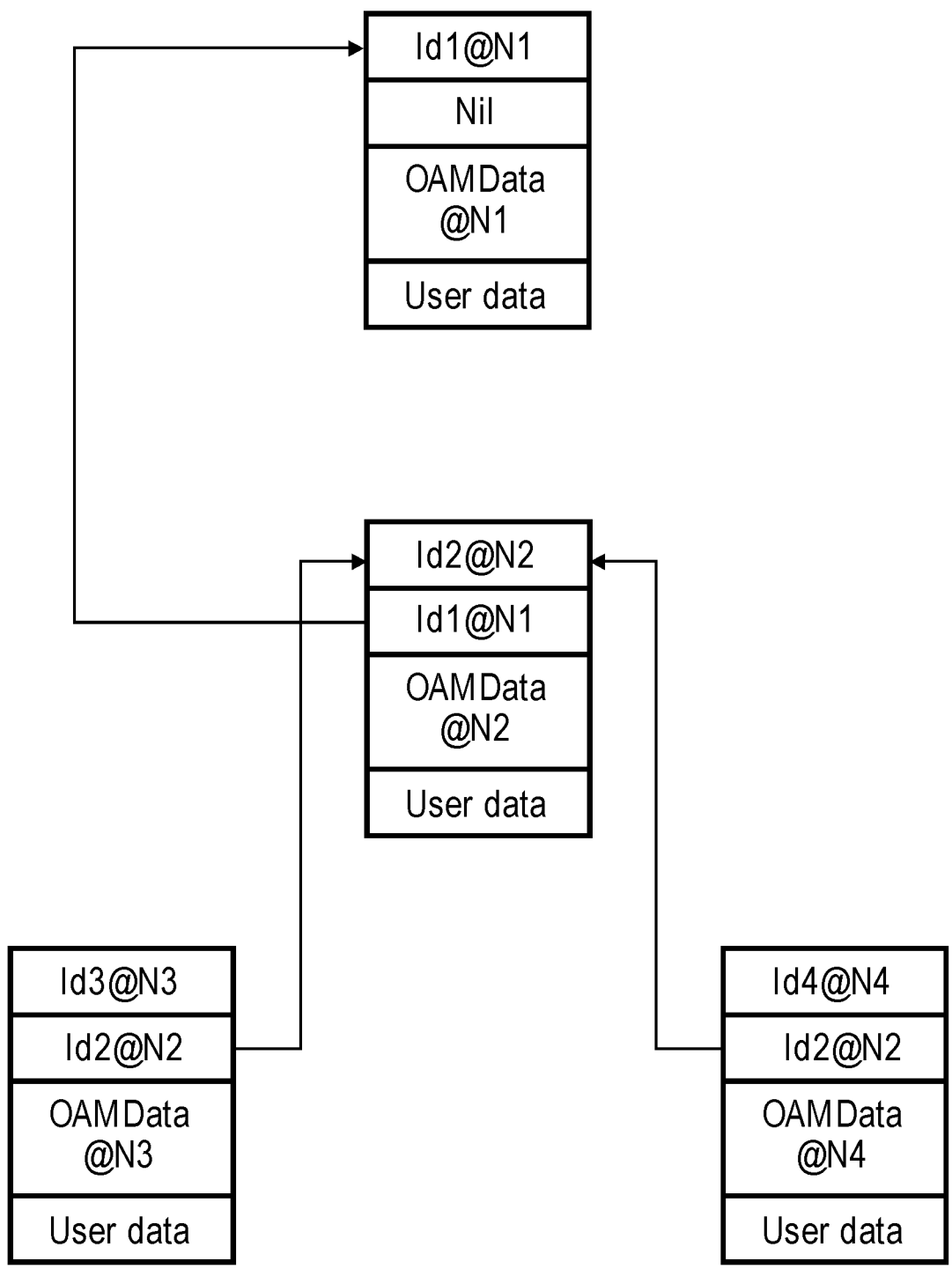
FIG. 5 is a diagram of one embodiment of a constructed packet trace at a collector.

FIG. 5 is a diagram of the set of OAM headers as they are constructed into a tree structure by a collector. The lines show the previous node fields in each of the OAM headers serve as pointers to the other OAM headers which are identified by their respective current node fields. Using this technique, the collector can create a tree data structure or in some simple cases a list data structure that represents the network path trace for an associated packet. The example shows that the OAM data for each stage/state of the packet can be stored with the OAM header as a discrete node in the tree data structure. Optionally, additional packet data or 'user data' can also be stored with the nodes. In other embodiments, this user data may not be sent to the collector or a subset of the user data may be provided.

This process provides a number of advantages over the processes and structures of the prior art. The advantages of the embodiments include that the packet trace can be done for an arbitrarily large network. This is because there is a single constant size OAM header that is used/updated across all nodes of the network trace. There is no additional processing requirement on the encapsulating OAM node to identify the minimum path MTU for the packet. The advantages further include simplified operations for hardware and software switches since there is only an update to existing data fields. There is no addition of fields to the header or change in packet size at each node in contrast to the incremental option.

Figure 6:
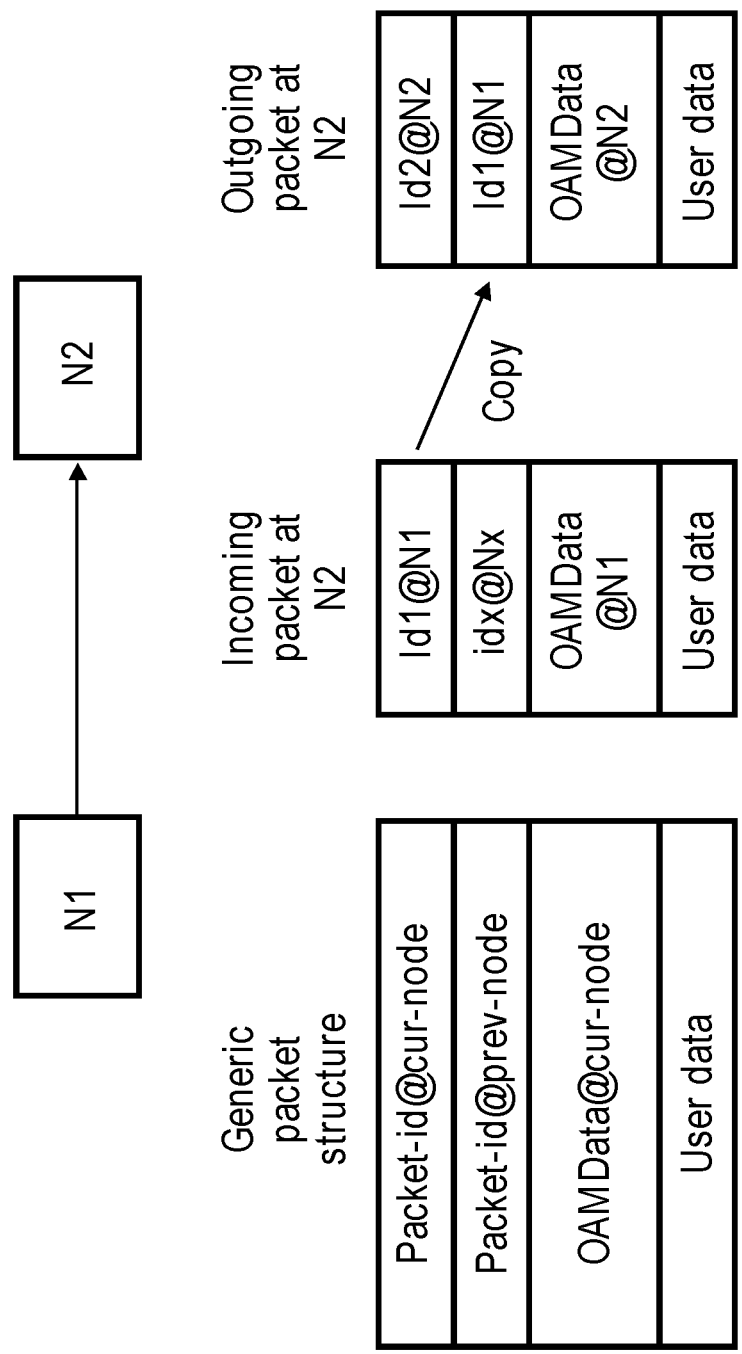
FIG. 6 is a diagram of one embodiment of a process of updating OAM packet header during a path trace.

The embodiments are described in greater detail with reference to FIG. 6, which illustrates the processing of the OAM header at each stage along its network trace path. As shown in FIG. 6, where N1 can be considered the encapsulating OAM node, the embodiments utilize an OAM header with packet fields including a current node field, previous node field and an OAM data field.

The current node field, shown as the 'packet-id@cur-node' field in the illustration provides identification for the data packet at the current network node. The embodiments include processes to generate this field by corribining two values a node identifier and a counter. The node identifier is a value that uniquely identifies the network node within the in-situ OAM domain in which the network path trace is being carried out. The counter field uniquely identifies the packet within the network node. This counter field is incremented by 1 after it is used for a packet. This field may rollover after a certain (maximum) number of packets has been traced. The size of the counter should be large enough so that counter values after rollover do not cause conflict with previous counter values.

The previous node field, shown as the 'packet-id@prev-node' field in the illustration provides identification for the data packet at a previous network node. Unlike the current node field, the information for this field is not generated at the current node. This previous node field is populated from information already present in an incoming packet. The size of this field is same as the current node field (i.e., the packet-id@cur@node field).

The current node can populate the previous node field by copying the whole current node field during the OAM header update process. This previous node field may be placed at a subsequent or following position relative to current node field. For example, in one scheme the previous node field is stored immediately after the current node field in the OAM header, as illustrated in FIG. 6. In this scheme, the current node copies the current node field from the incoming packet to the previous node field thereby initiallypopulating this field or overwriting an old previous node field value.

Figure 7:
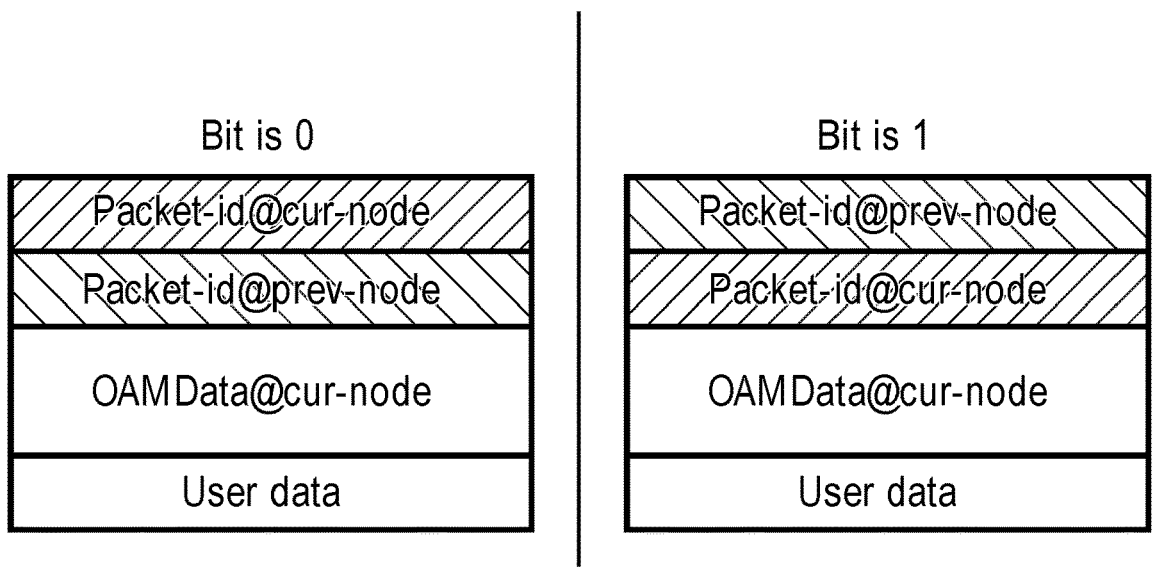
FIG. 7 is a diagram of one embodiment of a process of updating OAM packet header during a path trace using a toggle of a bit field.

In another embodiment, the updating process avoids making a copy of the current node field into the previous node field by use of a specialized bit field. This may be a 1 bit field. The field is used to indicate the location of a current node field and previous node field. For example, when the location bit value is 0, it indicates the current node field (i.e., the packet-id@cur-node field) precedes the previous node field (i.e., the packet-id@prev-node field). However, when the location bit value is 1, it indicates the previous node field precedes the current node field. FIG. 7 is a diagram showing the use of a location bit field to dynamically alter the location of the current node field and the previous node field to avoid the need of copying date from one field to the other.

With such a scheme, the current node field only needs to be toggled to a new location via the location bit-field to update the previous node field. There is no need to copy the whole current node field. These two schemes allow a trade-off between additional data (viz the extra location bit field) and copying of data.

The OAM data field (i.e., the oam-data@cur-node field in FIGS. 5 and 6) stores the OAM information of the current node. This information can include an identifier of ingress interface at the current node, an identifier of the egress interface at the current node, a time of day when the data packet was processed (e.g., a time stamp at the time of receipt, processing and/or transmission), free-form data where syntax and semantics are defined by operator or provider of the in-situ OAM domain and similar information.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 8:
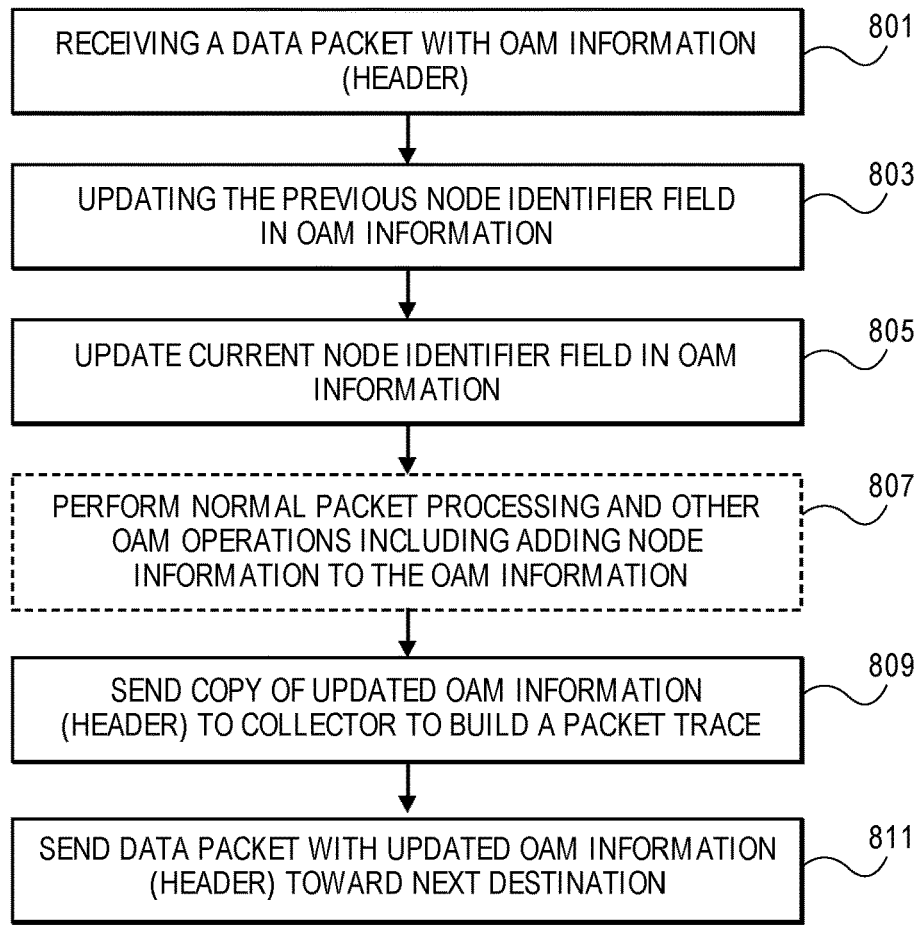
FIG. 8 is a flowchart of one embodiment of a process of updating an OAM packet during a path trace at an updating node.

FIG. 8 is a flowchart of the process for updating the OAM header at the nodes transited within the in-situ OAM domain. The update process is executed upon receiving the data packet, where the executing node is the current node and the previous node is the node that sent the data packet to the current node. The OAM header is initially generated and added to a data packet by the encapsulating node. The encapsulating node populates the current node field with the current node information for the encapsulating node and similarly populates the OAM data field. The previous node field is not populated and the data packet with the encapsulating OAM header is sent to the next node along the network path to a destination identified by the underlying packet.

At the transit nodes, the data packet with the OAM header is received at an ingress interface (Block 801). An OAM update process handles the update of the OAM header. The previous node field is updated by either copying the data from the current node field or by toggling the location of the previous node field to be the location of the current node field (Block 803). The OAM update process then adds or overwrites the value of the current node field with an identity of the current node (e.g., fills packet-id@cur-node field) (Block 805). The current node then may perform any normal (i.e., non-OAM related) processing of the user data in the data packet (Block 807). The OAM update process or other OAM function may add other OAM data for the current node by placing or modifying this data in the OAM data field. (e.g., in the oam-data@cur-node field).

The OAM update process sends a copy of the entire data packet (or the OAM headers and/or any encapsulated header information of the data packet) to a collector that may be executed by a remote, local or centralized node (Block 809). The collector can use the copy to generate a data structure to represent the network path trace. The forwarding engine of the current node can then send the data packet toward its destination via an egress interface to a next hop node (Block 811). The current node identifier and the previous node identifiers may be unique identifiers within the scope of the OAM domain. The node information can also include a packet identifier that is unique within the issuing node.

Figure 9:
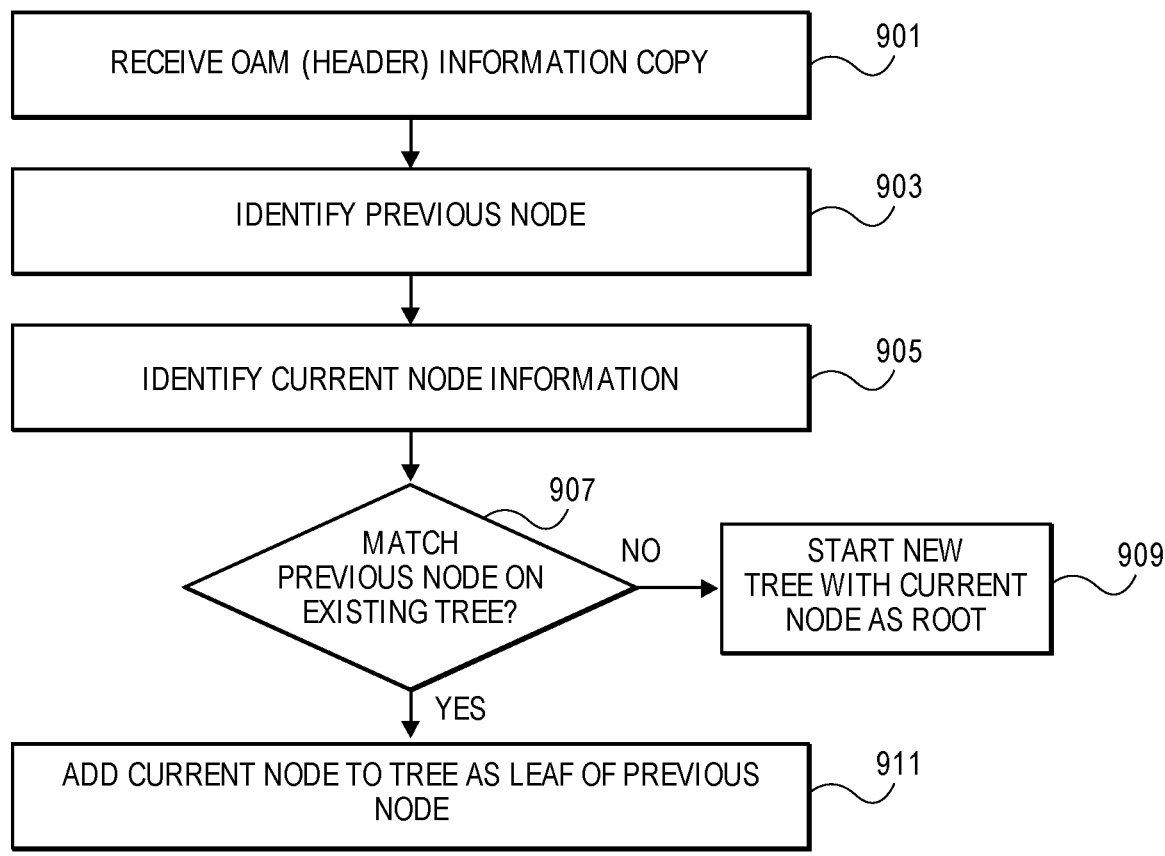
FIG. 9 is a flowchart of one embodiment of a process of constructing a path trace at a collector.

FIG. 9 is a flowchart of one embodiment of the process of a collector to construct a network path trace. The collector receives OAM header copies or copies of a data packet including an OAM header from nodes in the in-situ OAM domain that are transited by the data packet (Block 901). As each copy is received, the collector identifies the previous node field and previous node value in the copy (Block 901). This value serves as a pointer to a parent node in a data structure into which this received copy is to be placed. The collector also identifies the current node field and current node information including OAM information in the received copy (Block 905). This information may be extracted or left in the copy where the copy is placed entirely into the network path trace data structure. The previous node field information is used to find a previous node in a tree data structure of an existing network path trace that is being constructed (Block 907). If a matching previous node is found, then the copy can be placed in the tree data structure as a child with a pointer to the parent previous node (Block 911). If no matching previous node is received or the previous node field is blank, then the collector can start a new data structure with this copy as the root of the tree data structure that represents the network path trace for the associated data packet.

Figure 10:
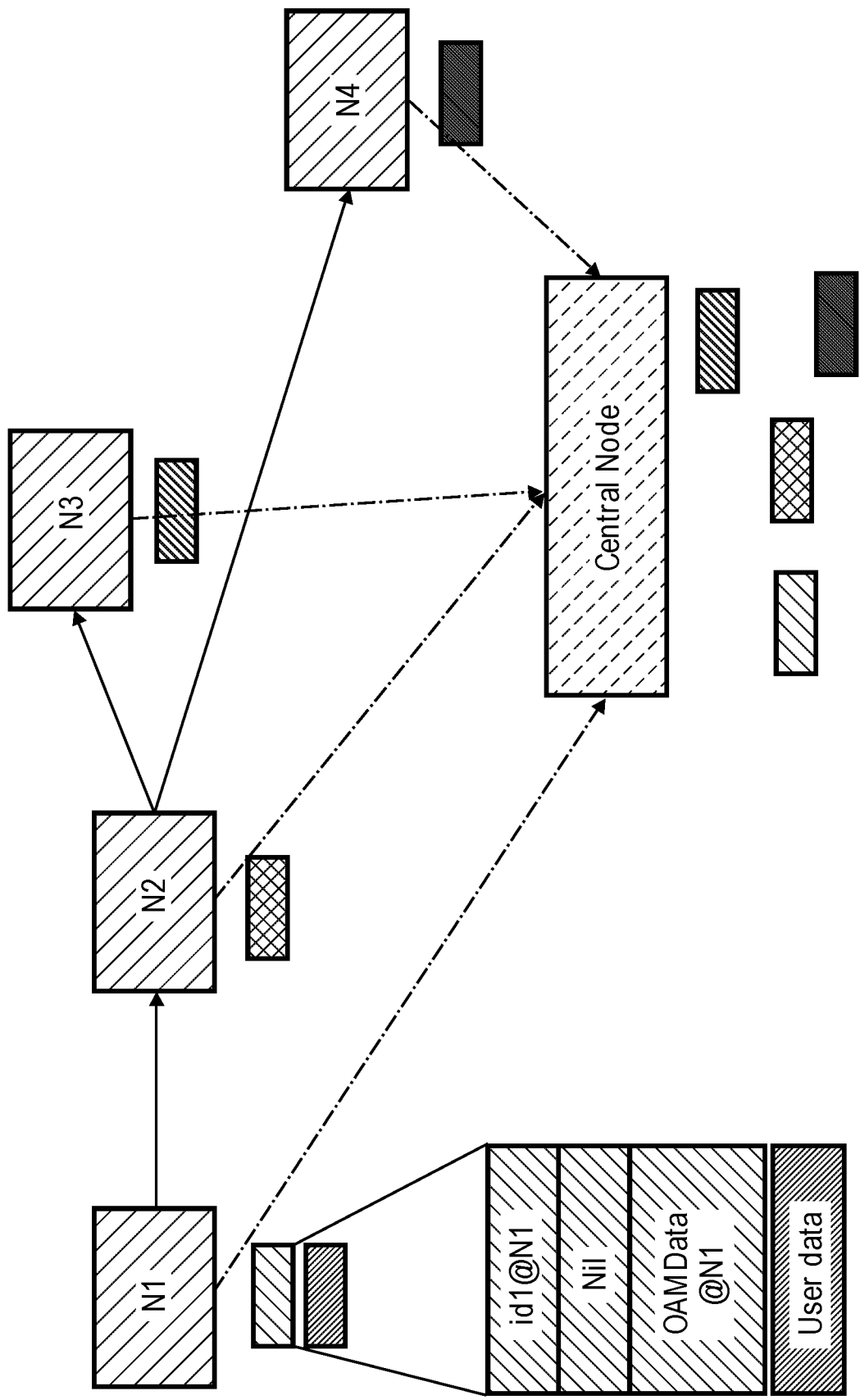
FIG. 10 is a diagram of one embodiment of a process of constructing a path trace at a collector.

FIG. 10 is a diagram that illustrates the process by which each transit node sends copies of its current node data to the collector. In the example of the diagram the collector is implemented at a centralized node, such as a controller node in a software defined networking (SDN) network. The diagram indicates the network trace path of a data packet through an in-situ OAM domain network. It also indicates that each transit nodes sends a copy of data packet (or the OAM header information) to a collector where the network path trace is reconstructed as a tree data structure or similar data structure.

Thus, these processes of the updating process at the transit nodes and the construction process of the collector improve on prior network path tracing by using an in-situ OAM mechanism that is more robust and able to scale to arbitrarily large networks. This is because the embodiments provide a process where each network node does not need to append OAM data to the data packet. The prior processes that append data or only supported a fixed number of nodes limit the scalability since the addition of OAM data should not cause packet fragmentation. The embodiments provide a way to scale the in-situ OAM mechanism by sending the fixed OAM header including sending a copy of OAM data and trace information from each transited node to a collector (e.g., at a central node). The trace information contains sufficient information to re-construct the complete network path trace for a packet.

Figures 11A, 11B:
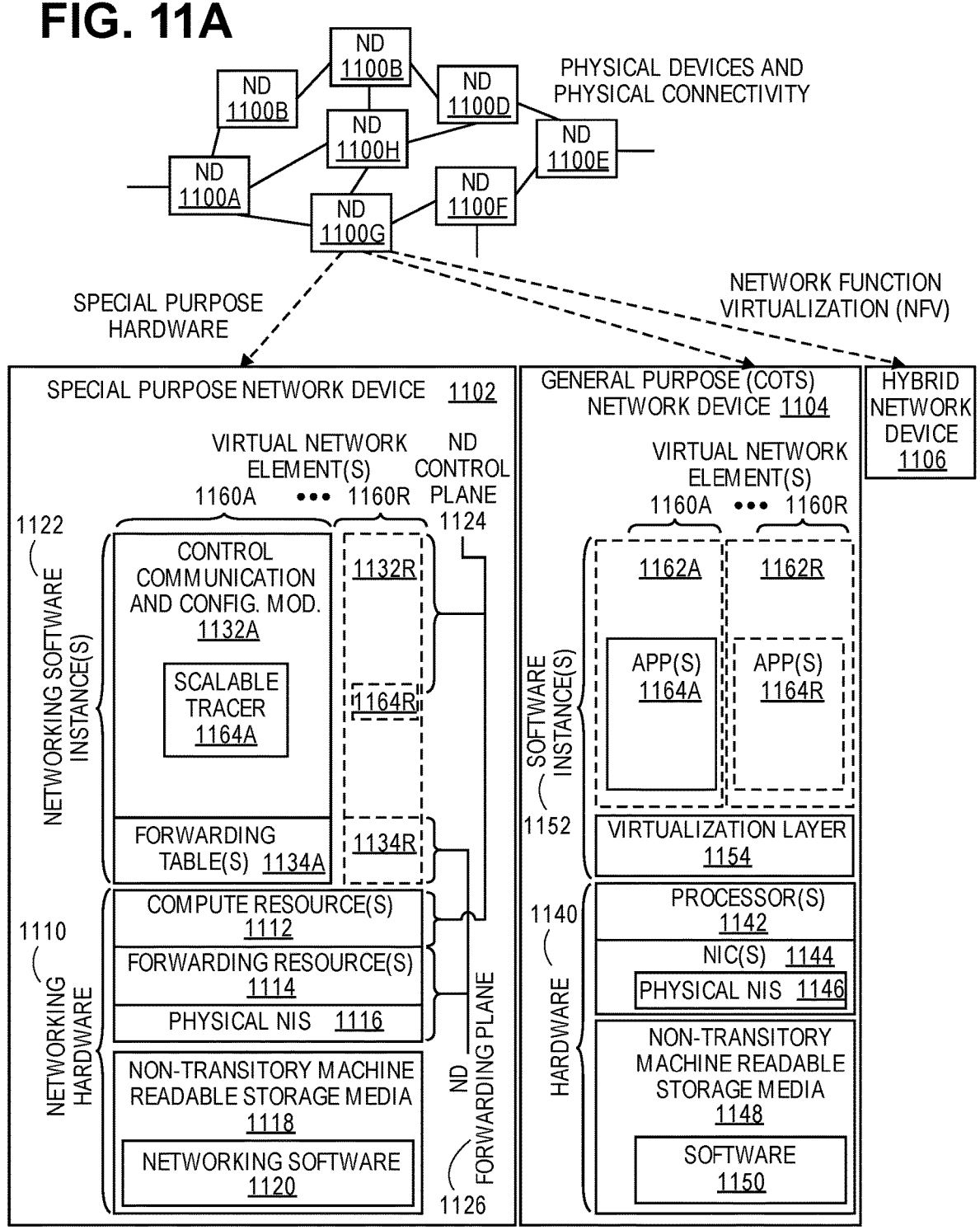
FIG. 11A illustrates connectivity between network devices (NDs) within an exemplary network, as well as three exemplary implementations of the NDs, according to some embodiments of the invention.
FIG. 11B illustrates an exemplary way to implement a special-purpose network device according to some embodiments of the invention.

FIG. 11A illustrates connectivity between network devices (NDs) within an exemplary network, as well as three exemplary implementations of the NDs, according to some embodiments of the invention. FIG. 11A shows NDs 1100A-H, and their connectivity by way of lines between 1100A-1100B, 1100B-1100C, 1100C-1100D, 1100D-1100E, 1100E-1100F, 1100F-1100G, and 1100A-1100G, as well as between 1100H and each of 1100A, 1100C, 1100D, and 1100G. These NDs are physical devices, and the connectivity between these NDs can be wireless or wired (often referred to as a link). An additional line extending from NDs 1100A, 1100E, and 1100F illustrates that these NDs act as ingress and egress points for the network (and thus, these NDs are sometimes referred to as edge NDs; while the other NDs may be called core NDs).

Two of the exemplary ND implementations in FIG. 11A are: 1) a special-purpose network device 1102 that uses custom application-specific integrated-circuits (ASICs) and a special-purpose operating system (OS); and 2) a general-purpose network device 1104 that uses common off-the-shelf (COTS) processors and a standard OS.

The special-purpose network device 1102 includes networking hardware 1110 comprising a set of one or more processor(s) 1112, forwarding resource(s) 1114 (which typically include one or more ASICs and/or network processors), and physical network interfaces (NIs) 1116 (through which network connections are made, such as those shown by the connectivity between NDs 1100A-H), as well as non-transitory machine-readable storage media 1118 having stored therein networking software 1120. During operation, the networking software 1120 may be executed by the networking hardware 1110 to instantiate a set of one or more networking software instance(s) 1122. Each of the networking software instance(s) 1122, and that part of the networking hardware 1110 that executes that network software instance (be it hardware dedicated to that networking software instance and/or time slices of hardware temporally shared by that networking software instance with others of the networking software instance(s) 1122), form a separate virtual network element 1130A-R. Each of the virtual network element(s) (VNEs) 1130A-R includes a control communication and configuration module 1132A-R (sometimes referred to as a local control module or control communication module) and forwarding table(s) 1134A-R, such that a given virtual network element (e.g., 1130A) includes the control communication and configuration module (e.g., 1132A), a set of one or more forwarding table(s) (e.g., 1134A), and that portion of the networking hardware 1110 that executes the virtual network element (e.g., 1130A). In one embodiment, the network software instances 1122 may implement the scalable tracer 1164A-R as described herein above.

The special-purpose network device 1102 is often physically and/or logically considered to include: 1) a ND control plane 1124 (sometimes referred to as a control plane) comprising the processor(s) 1112 that execute the control communication and configuration module(s) 1132A-R; and 2) a ND forwarding plane 1126 (sometimes referred to as a forwarding plane, a data plane, or a media plane) comprising the forwarding resource(s) 1114 that utilize the forwarding table(s) 1134A-R and the physical NIs 1116. By way of example, where the ND is a router (or is implementing routing functionality), the ND control plane 1124 (the processor(s) 1112 executing the control communication and configuration module(s) 1132A-R) is typically responsible for participating in controlling how data (e.g., packets) is to be routed (e.g., the next hop for the data and the outgoing physical NI for that data) and storing that routing information in the forwarding table(s) 1134A-R, and the ND forwarding plane 1126 is responsible for receiving that data on the physical NIs 1116 and forwarding that data out the appropriate ones of the physical NIs 1116 based on the forwarding table(s) 1134A-R.

FIG. 11B illustrates an exemplary way to implement the special-purpose network device 1102 according to some embodiments of the invention. FIG. 11B shows a special-purpose network device including cards 1138 (typically hot pluggable). While in some embodiments the cards 1138 are of two types (one or more that operate as the ND forwarding plane 1126 (sometimes called line cards), and one or more that operate to implement the ND control plane 1124 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 1136 (e.g., a first full mesh coupling the line cards and a second full mesh coupling all of the cards).

Returning to FIG. 11A, the general-purpose network device 1104 includes hardware 1140 comprising a set of one or more processor(s) 1142 (which are often COTS processors) and physical NIs 1146, as well as non-transitory machine-readable storage media 1148 having stored therein software 1150. During operation, the processor(s) 1142 execute the software 1150 to instantiate one or more sets of one or more applications 1164A-R. While one embodiment does not implement virtualization, alternative embodiments may use different forms of virtualization. For example, in one such alternative embodiment the virtualization layer 1154 represents the kernel of an operating system (or a shim executing on a base operating system) that allows for the creation of multiple instances 1162A-R called software containers that may each be used to execute one (or more) of the sets of applications 1164A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 1154 represents a hypervisor (sometimes referred to as a virtual machine monitor (VMM)) or a hypervisor executing on top of a host operating system, and each of the sets of applications 1164A-R is run on top of a guest operating system within an instance 1162A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 1140, directly on a hypervisor (in which case the unikernel is sometimes described as running within a LibOS virtual machine), or in a software container, embodiments can be implemented fully with unikernels running directly on a hypervisor represented by virtualization layer 1154, unikernels running within software containers represented by instances 1162A-R, or as a combination of unikernels and the above-described techniques (e.g., unikernels and virtual machines both run directly on a hypervisor, unikernels and sets of applications that are run in different software containers).

The instantiation of the one or more sets of one or more applications 1164A-R, as well as virtualization if implemented, are collectively referred to as software instance(s) 1152. Each set of applications 1164A-R, corresponding virtualization construct (e.g., instance 1162A-R) if implemented, and that part of the hardware 1140 that executes them (be it hardware dedicated to that execution and/or time slices of hardware temporally shared), forms a separate virtual network element(s) 1160A-R. The set of applications 1164A-R can include the scalable tracer as described herein above.

The virtual network element(s) 1160A-R perform similar functionality to the virtual network element(s) 1130A-R—e.g., similar to the control communication and configuration module(s) 1132A and forwarding table(s) 1134A (this virtualization of the hardware 1140 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 1162A-R corresponding to one VNE 1160A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 1162A-R to VNEs also apply to embodiments where such a finer level of granularity and/or unikernels are used.

In certain embodiments, the virtualization layer 1154 includes a virtual switch that provides similar forwarding services as a physical Ethernet switch. Specifically, this virtual switch forwards traffic between instances 1162A-R and the physical NI(s) 1146, as well as optionally between the instances 1162A-R; in addition, this virtual switch may enforce network isolation between the VNEs 1160A-R that by policy are not permitted to communicate with each other (e.g., by honoring virtual local area networks (VLANs)).

The third exemplary ND implementation in FIG. 11A is a hybrid network device 1106, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 1102) could provide for para-virtualization to the networking hardware present in the hybrid network device 1106.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 1130A-R, VNEs 1160A-R, and those in the hybrid network device 1106) receives data on the physical NIs (e.g., 1116, 1146) and forwards that data out the appropriate ones of the physical NIs (e.g., 1116, 1146). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 11C:
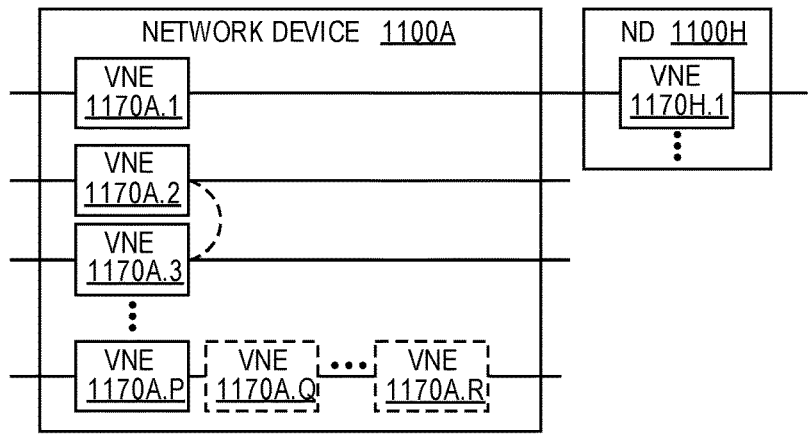
FIG. 11C illustrates various exemplary ways in which virtual network elements (VNEs) may be coupled according to some embodiments of the invention.

FIG. 11C illustrates various exemplary ways in which VNEs may be coupled according to some embodiments of the invention. FIG. 11C shows VNEs 1170A.1-1170A.P (and optionally VNEs 1170A.Q-1170A.R) implemented in ND 1100A and VNE 1170H.1 in ND 1100H. In FIG. 11C, VNEs 1170A.1-P are separate from each other in the sense that they can receive packets from outside ND 1100A and forward packets outside of ND 1100A; VNE 1170A.1 is coupled with VNE 1170H.1, and thus they communicate packets between their respective NDs; VNE 1170A.2-1170A.3 may optionally forward packets between themselves without forwarding them outside of the ND 1100A; and VNE 1170A.P may optionally be the first in a chain of VNEs that includes VNE 1170A.Q followed by VNE 1170A.R (this is sometimes referred to as dynamic service chaining, where each of the VNEs in the series of VNEs provides a different service—e.g., one or more layer 4-7 network services). While FIG. 11C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 11A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 11A may also host one or more such servers (e.g., in the case of the general purpose network device 1104, one or more of the software instances 1162A-R may operate as servers; the same would be true for the hybrid network device 1106; in the case of the special-purpose network device 1102, one or more such servers could also be run on a virtualization layer executed by the processor(s) 1112); in which case the servers are said to be co-located with the VNEs of that ND.

A virtual network is a logical abstraction of a physical network (such as that in FIG. 11A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 11D:
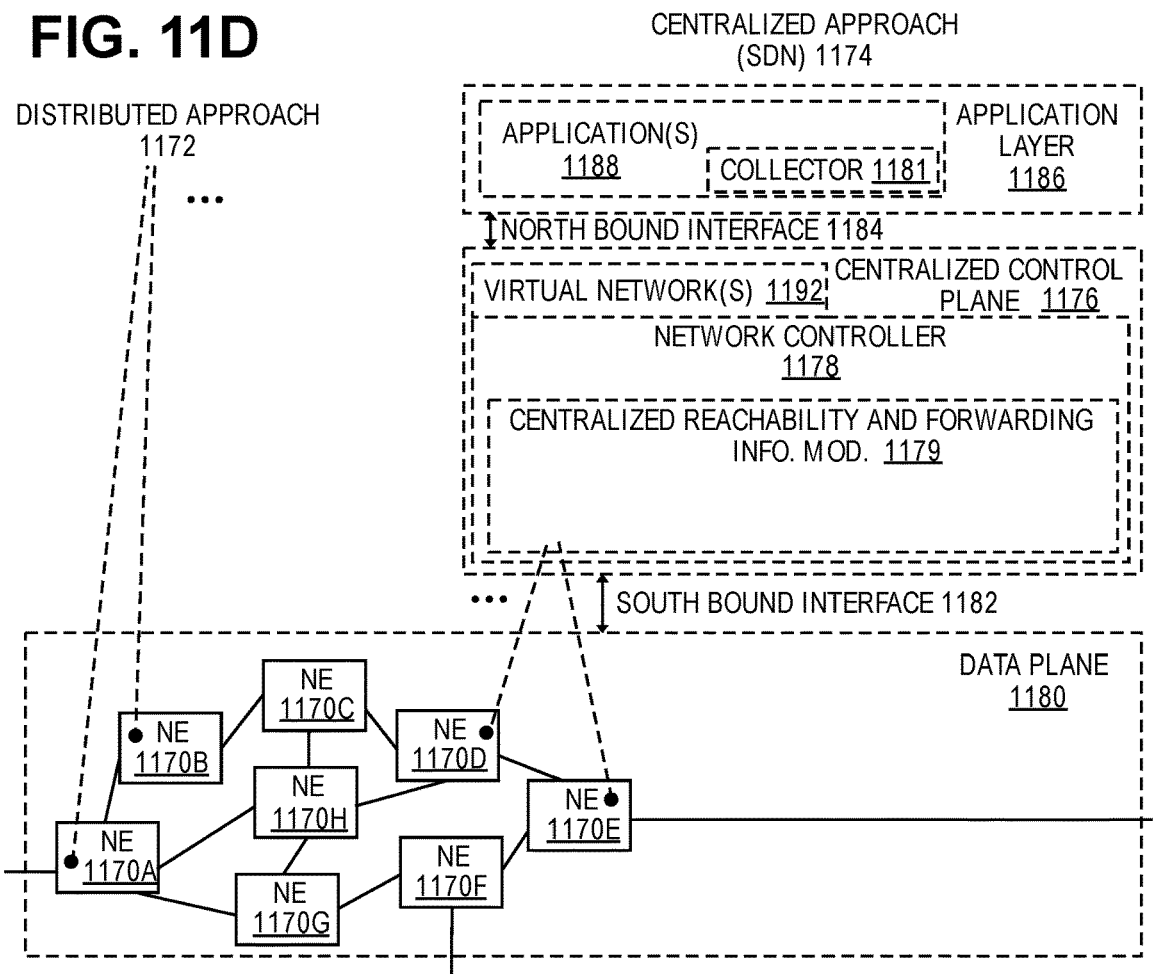
FIG. 11D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 11D illustrates a network with a single network element on each of the NDs of FIG. 11A, and within this straight forward approach contrasts a traditional distributed approach (commonly used by traditional routers) with a centralized approach for maintaining reachability and forwarding information (also called network control), according to some embodiments of the invention. Specifically, FIG. 11D illustrates network elements (NEs) 1170A-H with the same connectivity as the NDs 1100A-H of FIG. 11A.

FIG. 11D illustrates that the distributed approach 1172 distributes responsibility for generating the reachability and forwarding information across the NEs 1170A-H; in other words, the process of neighbor discovery and topology discovery is distributed.

For example, where the special-purpose network device 1102 is used, the control communication and configuration module(s) 1132A-R of the ND control plane 1124 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 1170A-H (e.g., the processor(s) 1112 executing the control communication and configuration module(s) 1132A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 1124. The ND control plane 1124 programs the ND forwarding plane 1126 with information (e.g., adjacency and route information) based on the routing structure(s). For example, the ND control plane 1124 programs the adjacency and route information into one or more forwarding table(s) 1134A-R (e.g., Forwarding Information Base (FIB), Label Forwarding Information Base (LFIB), and one or more adjacency structures) on the ND forwarding plane 1126. For layer 2 forwarding, the ND can store one or more bridging tables that are used to forward data based on the layer 2 information in that data. While the above example uses the special-purpose network device 1102, the same distributed approach 1172 can be implemented on the general-purpose network device 1104 and the hybrid network device 1106.

FIG. 11D illustrates that a centralized approach 1174 (also known as software defined networking (SDN)) that decouples the system that makes decisions about where traffic is sent from the underlying systems that forwards traffic to the selected destination. The illustrated centralized approach 1174 has the responsibility for the generation of reachability and forwarding information in a centralized control plane 1176 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 1176 has a south bound interface 1182 with a data plane 1180 (sometime referred to the infrastructure layer, network forwarding plane, or forwarding plane (which should not be confused with a ND forwarding plane)) that includes the NEs 1170A-H (sometimes referred to as switches, forwarding elements, data plane elements, or nodes). The centralized control plane 1176 includes a network controller 1178, which includes a centralized reachability and forwarding information module 1179 that determines the reachability within the network and distributes the forwarding information to the NEs 1170A-H of the data plane 1180 over the south bound interface 1182 (which may use the OpenFlow protocol). Thus, the network intelligence is centralized in the centralized control plane 1176 executing on electronic devices that are typically separate from the NDs.

For example, where the special-purpose network device 1102 is used in the data plane 1180, each of the control communication and configuration module(s) 1132A-R of the ND control plane 1124 typically include a control agent that provides the VNE side of the south bound interface 1182. In this case, the ND control plane 1124 (the processor(s) 1112 executing the control communication and configuration module(s) 1132A-R) performs its responsibility for participating in controlling how data (e.g., packets) is to be routed (e.g., the next hop for the data and the outgoing physical NI for that data) through the control agent communicating with the centralized control plane 1176 to receive the forwarding information (and in some cases, the reachability information) from the centralized reachability and forwarding information module 1179 (it should be understood that in some embodiments of the invention, the control communication and configuration module(s) 1132A-R, in addition to communicating with the centralized control plane 1176, may also play some role in determining reachability and/or calculating forwarding information—albeit less so than in the case of a distributed approach; such embodiments are generally considered to fall under the centralized approach 1174, but may also be considered a hybrid approach).

While the above example uses the special-purpose network device 1102, the same centralized approach 1174 can be implemented with the general purpose network device 1104 (e.g., each of the VNE 1160A-R performs its responsibility for controlling how data (e.g., packets) is to be routed (e.g., the next hop for the data and the outgoing physical NI for that data) by communicating with the centralized control plane 1176 to receive the forwarding information (and in some cases, the reachability information) from the centralized reachability and forwarding information module 1179; it should be understood that in some embodiments of the invention, the VNEs 1160A-R, in addition to communicating with the centralized control plane 1176, may also play some role in determining reachability and/or calculating forwarding information—albeit less so than in the case of a distributed approach) and the hybrid network device 1106. In fact, the use of SDN techniques can enhance the NFV techniques typically used in the general-purpose network device 1104 or hybrid network device 1106 implementations as NFV is able to support SDN by providing an infrastructure upon which the SDN software can be run, and NFV and SDN both aim to make use of commodity server hardware and physical switches.

FIG. 11D also shows that the centralized control plane 1176 has a north bound interface 1184 to an application layer 1186, in which resides application(s) 1188. The centralized control plane 1176 has the ability to form virtual networks 1192 (sometimes referred to as a logical forwarding plane, network services, or overlay networks (with the NEs 1170A-H of the data plane 1180 being the underlay network)) for the application(s) 1188. Thus, the centralized control plane 1176 maintains a global view of all NDs and configured NEs/VNEs, and it maps the virtual networks to the underlying NDs efficiently (including maintaining these mappings as the physical network changes either through hardware (ND, link, or ND component) failure, addition, or removal). The applications 1188 can include the collector 1181 as described herein above.

While FIG. 11D shows the distributed approach 1172 separate from the centralized approach 1174, the effort of network control may be distributed differently or the two combined in certain embodiments of the invention. For example: 1) embodiments may generally use the centralized approach (SDN) 1174, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 1174, but may also be considered a hybrid approach.

While FIG. 11D illustrates the simple case where each of the NDs 1100A-H implements a single NE 1170A-H, it should be understood that the network control approaches described with reference to FIG. 11D also work for networks where one or more of the NDs 1100A-H implement multiple VNEs (e.g., VNEs 1130A-R, VNEs 1160A-R, those in the hybrid network device 1106). Alternatively or in addition, the network controller 1178 may also emulate the implementation of multiple VNEs in a single ND. Specifically, instead of (or in addition to) implementing multiple VNEs in a single ND, the network controller 1178 may present the implementation of a VNE/NE in a single ND as multiple VNEs in the virtual networks 1192 (all in the same one of the virtual network(s) 1192, each in different ones of the virtual network(s) 1192, or some combination). For example, the network controller 1178 may cause an ND to implement a single VNE (a NE) in the underlay network, and then logically divide up the resources of that NE within the centralized control plane 1176 to present different VNEs in the virtual network(s) 1192 (where these different VNEs in the overlay networks are sharing the resources of the single VNE/NE implementation on the ND in the underlay network).

Figure 11E:
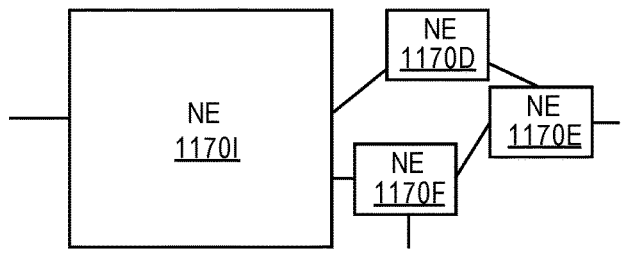
FIG. 11E illustrates the simple case of where each of the NDs implements a single NE, but a centralized control plane has abstracted multiple of the NEs in different NDs into (to represent) a single NE in one of the virtual network(s), according to some embodiments of the invention.
Figure 11F:
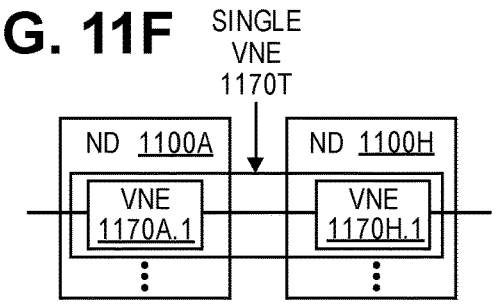
FIG. 11F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 11E and 11F respectively illustrate exemplary abstractions of NEs and VNEs that the network controller 1178 may present as part of different ones of the virtual networks 1192. FIG. 11E illustrates the simple case of where each of the NDs 1100A-H implements a single NE 1170A-H (see FIG. 11D), but the centralized control plane 1176 has abstracted multiple of the NEs in different NDs (the NEs 1170A-C and G-H) into (to represent) a single NE 11701 in one of the virtual network(s) 1192 of FIG. 11D, according to some embodiments of the invention. FIG. 11E shows that in this virtual network, the NE 11701 is coupled to NE 1170D and 1170F, which are both still coupled to NE 1170E.

FIG. 11F illustrates a case where multiple VNEs (VNE 1170A.1 and VNE 1170H.1) are implemented on different NDs (ND 1100A and ND 1100H) and are coupled to each other, and where the centralized control plane 1176 has abstracted these multiple VNEs such that they appear as a single VNE 1170T within one of the virtual networks 1192 of FIG. 11D, according to some embodiments of the invention. Thus, the abstraction of a NE or VNE can span multiple NDs.

While some embodiments of the invention implement the centralized control plane 1176 as a single entity (e.g., a single instance of software running on a single electronic device), alternative embodiments may spread the functionality across multiple entities for redundancy and/or scalability purposes (e.g., multiple instances of software running on different electronic devices).

Figure 12:
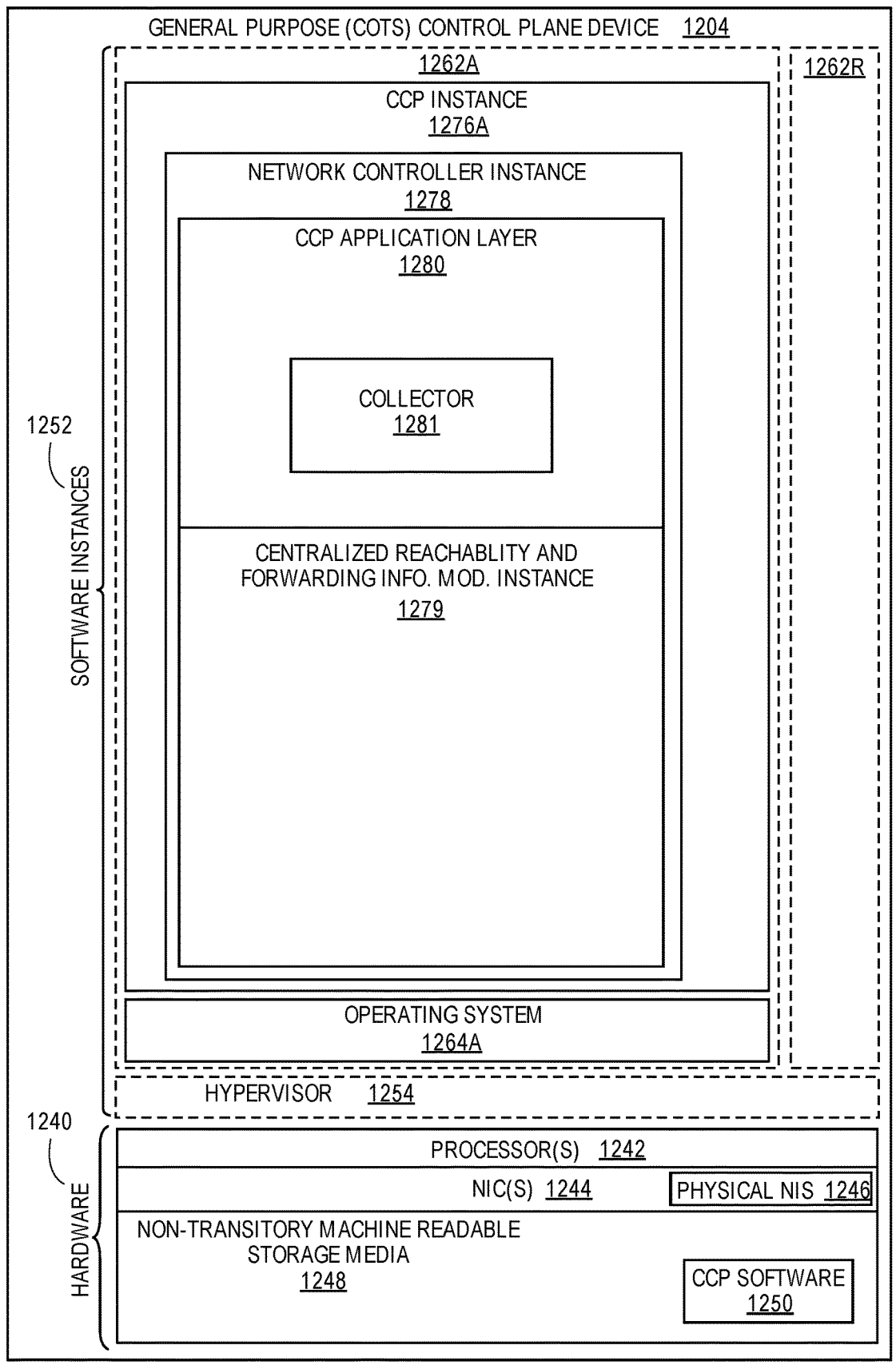
FIG. 12 illustrates a general-purpose control plane device with centralized control plane (CCP) software 1250), according to some embodiments of the invention.

Similar to the network device implementations, the electronic device(s) running the centralized control plane 1176, and thus the network controller 1178 including the centralized reachability and forwarding information module 1179, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 12 illustrates, a general-purpose control plane device 1204 including hardware 1240 comprising a set of one or more processor(s) 1242 (which are often COTS processors) and physical NIs 1246, as well as non-transitory machine-readable storage media 1248 having stored therein centralized control plane (CCP) software 1250.

In embodiments that use compute virtualization, the processor(s) 1242 typically execute software to instantiate a virtualization layer 1254 (e.g., in one embodiment the virtualization layer 1254 represents the kernel of an operating system (or a shim executing on a base operating system) that allows for the creation of multiple instances 1262A-R called software containers (representing separate user spaces and also called virtualization engines, virtual private servers, or jails) that may each be used to execute a set of one or more applications; in another embodiment the virtualization layer 1254 represents a hypervisor (sometimes referred to as a virtual machine monitor (VMM)) or a hypervisor executing on top of a host operating system, and an application is run on top of a guest operating system within an instance 1262A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 1240, directly on a hypervisor represented by virtualization layer 1254 (in which case the unikernel is sometimes described as running within a LibOS virtual machine), or in a software container represented by one of instances 1262A-R). Again, in embodiments where compute virtualization is used, during operation an instance of the CCP software 1250 (illustrated as CCP instance 1276A) is executed (e.g., within the instance 1262A) on the virtualization layer 1254. In embodiments where compute virtualization is not used, the CCP instance 1276A is executed, as a unikernel or on top of a host operating system, on the "bare metal" general purpose control plane device 1204. The instantiation of the CCP instance 1276A, as well as the virtualization layer 1254 and instances 1262A-R if implemented, are collectively referred to as software instance(s) 1252.

In some embodiments, the CCP instance 1276A includes a network controller instance 1278. The network controller instance 1278 includes a centralized reachability and forwarding information module instance 1279 (which is a middleware layer providing the context of the network controller 1178 to the operating system and communicating with the various NEs), and an CCP application layer 1280 (sometimes referred to as an application layer) over the middleware layer (providing the intelligence required for various network operations such as protocols, network situational awareness, and user-interfaces). At a more abstract level, this CCP application layer 1280 within the centralized control plane 1176 works with virtual network view(s) (logical view(s) of the network) and the middleware layer provides the conversion from the virtual networks to the physical view. The CCP application layer can include the collector 1281 as described herein above.

The centralized control plane 1176 transmits relevant messages to the data plane 1180 based on CCP application layer 1280 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 1180 may receive different messages, and thus different forwarding information. The data plane 1180 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 1180, the packet (or a subset of the packet header and content) is typically forwarded to the centralized control plane 1176. The centralized control plane 1176 will then program forwarding table entries into the data plane 1180 to accommodate packets belonging to the flow of the unknown packet. Once a specific forwarding table entry has been programmed into the data plane 1180 by the centralized control plane 1176, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

A Layer 3 (L3) Link Aggregation (LAG) link is a link directly connecting two NDs with multiple IP-addressed link paths (each link path is assigned a different IP address), and a load distribution decision across these different link paths is performed at the ND forwarding plane; in which case, a load distribution decision is made between the link paths.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method executed by a network device functioning as a node in a network to enable scalable network path tracing, the method comprising:
    receiving from a node a data packet with a fixed size operations, administration and maintenance (OAM) header comprising OAM information;
    updating a previous node identifier field in the OAM information, updating the previous node identifier field comprising overwriting data in the previous node identifier field with data identifying the node from which the data packet is received;
    updating a current node identifier field in the OAM information, updating the current node identifier field comprising overwriting data in the current node identifier field with data identifying the node at which the updating step is being performed; and
    sending a copy of the updated data packet with OAM information to a collector to build a packet trace.

2. The method of claim 1, wherein updating the current node identifier field further comprises:
    adding a unique node identifier for the current node, where a scope of the unique node identifier is an OAM domain; and
    adding a unique packet identifier for the data packet, where a scope of the unique packet identifier is the current node.

3. The method of claim 2, wherein unique packet identifier is generated using a running counter.

4. The method of claim 1, wherein updating the previous node identifier field further comprises:
    toggling a bit field indicating a relative location of the previous node field and the current node field.

5. The method of claim 1, further comprising:
    adding node information to a node information field of the OAM information, wherein the node information includes any one of an identifier of an ingress interface, an identifier of an egress interface, a time stamp for processing of the OAM packet and operator specific defined fields.

6. A network device functioning as a node in a network to enable scalable network path tracing, the network device comprising:
    a non-transitory machine-readable medium having stored therein a scalable tracer; and
    a processor coupled to the non-transitory machine-readable medium, the processor to execute the scalable tracer, the scalable tracer to receive a data packet with a fixed size operations, administration and maintenance (OAM) header comprising OAM information, to update a previous node identifier field in the OAM information, to update a current node identifier field in the OAM information, and to send a copy of the updated data packet with OAM information to a collector to build a packet trace,
    updating the previous node identifier field comprising:
        overwriting data in the previous node identifier field with data identifying the node from which the data packet is received; and
    updating the current node identifier field comprising:
        overwriting data in the current node identifier field with data identifying the node at which the updating step is being performed.

7. The network device of claim 6, wherein scalable tracer updates the current node identifier field further by adding a unique node identifier for the current node, where a scope of the unique node identifier is an OAM domain, and adding a unique packet identifier for the data packet, where a scope of the unique packet identifier is the current node.

8. The network device of claim 7, wherein unique packet identifier is generated using a running counter.

9. The network device of claim 6, wherein the scalable tracer is to update the previous node field by toggling a bit field indicating a relative location of the previous node field and the current node field.

10. The network device of claim 6, wherein the current node information includes any one of an identifier of an ingress interface, an identifier of an egress interface, a time stamp for processing of the OAM information and operator specific defined fields.

11. A computing device in communication with a network device, the computing device to execute a plurality of virtual machines for implementing network function virtualization (NFV), the computing device configured to execute a method to enable scalable network path tracing, the network device comprising:
    a non-transitory machine-readable medium having stored therein a scalable tracer; and
    a processor coupled to the non-transitory machine-readable medium, the processor to execute a virtual machine from the plurality of virtual machines, the virtual machine to execute the scalable tracer, the scalable tracer to receive a data packet with a fixed size operations, administration and maintenance (OAM) header comprising OAM information, to update a previous node identifier field in the OAM information, to update a current node identifier field in the OAM information, and to send a copy of the updated data packet with OAM information to a collector to build a packet trace,
    updating the previous node identifier field comprising:
        overwriting data in the previous node identifier field with data identifying the node from which the data packet is received; and
    updating the current node identifier field comprising:

overwriting data in the current node identifier field with data identifying the node at which the updating step is being performed.

12. The computing device of claim 11, wherein scalable tracer updates the current node identifier field further by adding a unique node identifier for the current node, where a scope of the unique node identifier is an OAM domain, and adding a unique packet identifier for the data packet, where a scope of the unique packet identifier is the current node.

13. The computing device of claim 12, wherein unique packet identifier is generated using a running counter.

14. The computing device of claim 11, wherein the scalable tracer is to update the previous node field by toggling a bit field indicating a relative location of the previous node field and the current node field.

15. The computing device of claim 11, wherein the current node information includes any one of an identifier of an ingress interface, an identifier of an egress interface, a time stamp for processing of the OAM information and operator specific defined fields.

16. A controller device in communication with a network device, the controller device configured to execute a method to enable scalable network path tracing, the controller device comprising:
a non-transitory machine-readable medium having stored therein a collector; and
a processor coupled to the non-transitory machine-readable medium, the processor to execute the collector, the collector to receive an updated copy of a fixed size operations, administration and maintenance (OAM) header, the updated copy of the OAM header comprising OAM information and the OAM information comprising a previous node identifier field and a current node identifier field, the previous node identifier field being updated at the network device by overwriting with data identifying the previous node and the current node identifier field being updated at the network device by overwriting with data with data identifying the current node, to identify a previous node from the previous node identifier field, to identify current node information from the current node identifier field, to add the current node information to a tree representing a trace as a leaf node where the leaf node is dependent from the previous node in the tree and to match the previous node with a node on the tree.

17. The controller device of claim 16, wherein the collector is to start a new tree representing a new trace in response to not finding a match of the previous node in an existing tree.

18. The controller device of claim 16, wherein the current node information includes any one of an identifier of an ingress interface, an identifier of an egress interface, a time stamp for processing of the OAM information and operator specific defined fields.

* * * * *